United States Patent
Götz et al.

(10) Patent No.: US 8,880,641 B2
(45) Date of Patent: Nov. 4, 2014

(54) REDUNDANT COMMUNICATION IN A COMMUNICATION SYSTEM

(75) Inventors: Franz-Josef Götz, Heideck (DE); Dieter Klotz, Fuerth (DE); Joachim Lohmeyer, Hilpoltstein (DE)

(73) Assignee: Siemens Aktiengesellschaft, Munich (DE)

( * ) Notice: Subject to any disclaimer, the term of this patent is extended or adjusted under 35 U.S.C. 154(b) by 156 days.

(21) Appl. No.: 13/192,789

(22) Filed: Jul. 28, 2011

(65) Prior Publication Data

US 2012/0030310 A1 Feb. 2, 2012

(30) Foreign Application Priority Data

Jul. 30, 2010 (EP) .................................. 10008005

(51) Int. Cl.
*G06F 15/16* (2006.01)
*H04L 12/437* (2006.01)

(52) U.S. Cl.
CPC .................................. *H04L 12/437* (2013.01)
USPC ........... 709/217; 709/218; 709/219; 709/235; 709/249; 709/250; 709/251; 370/222; 370/223; 370/224; 370/258; 370/403

(58) Field of Classification Search
CPC .............. H04L 12/42; H04L 12/4637; H04L 12/40176; H04L 45/18; H04L 47/10; H04L 47/12; H04L 47/13
USPC ......... 709/217, 218, 219, 235, 249, 250, 251; 370/222, 223, 224, 258, 403
See application file for complete search history.

(56) References Cited

U.S. PATENT DOCUMENTS

| | | | | |
|---|---|---|---|---|
| 5,168,496 | A | * | 12/1992 | Ohba et al. .................... 370/402 |
| 2002/0064157 | A1 | * | 5/2002 | Krause ........................... 370/393 |
| 2003/0043792 | A1 | * | 3/2003 | Carpini et al. ................ 370/386 |
| 2006/0092856 | A1 | * | 5/2006 | Mitsumori .................... 370/254 |
| 2006/0215544 | A1 | | 9/2006 | Abe et al. |
| 2006/0253613 | A1 | * | 11/2006 | Leary et al. ................... 709/250 |
| 2007/0115809 | A1 | * | 5/2007 | Mazzurco et al. ............ 370/222 |
| 2007/0127394 | A1 | * | 6/2007 | Stirbu et al. .................. 370/254 |
| 2007/0217345 | A1 | * | 9/2007 | Jujii et al. ..................... 370/254 |
| 2009/0016384 | A1 | | 1/2009 | Cheng |
| 2009/0268610 | A1 | | 10/2009 | Wu |
| 2009/0268627 | A1 | * | 10/2009 | de Frias Rebelo Nunes . 370/252 |
| 2009/0296569 | A1 | * | 12/2009 | Ramalho Ribeiro Dos Santos et al. .............................. 370/222 |
| 2009/0323521 | A1 | * | 12/2009 | Tochio .......................... 370/225 |
| 2010/0020809 | A1 | * | 1/2010 | Jones et al. ............... 370/395.53 |

* cited by examiner

*Primary Examiner* — Liangche A Wang
*Assistant Examiner* — Johnny Aguiar
(74) *Attorney, Agent, or Firm* — Cozen O'Connor

(57) ABSTRACT

A method for redundant communication in a communication system having a plurality of communication networks connected to one another by at least one node, wherein data that originates from a first communication network is prevented from being transmitted back from the second the communication network into the first communication network as a result of information that is predefined before the transmission.

9 Claims, 8 Drawing Sheets

ID="N" />

REDUNDANT COMMUNICATION IN A COMMUNICATION SYSTEM

BACKGROUND OF THE INVENTION

1. Field of the Invention

The invention relates to redundant communication in a communication system and, more particularly, to redundant communication in a communication system with a plurality of communication networks.

2. Description of the Related Art

In general, a communication network can comprise a combination of a plurality of network devices that can communicate with each other wirelessly by network cables. In a communication system with a number of communication networks, the communication networks are connected to each other by nodes. The nodes serve to enable the transmittal of data from a first communication network into a second network and from the second network into the first communication network. Communication across a plurality of networks is also possible in such a communication system.

Redundant communication in such a communication system is of advantage because an interruption of the communication path in such a network does not automatically mean that communication cannot occur. When a second communication path is used, this second can serve as an alternative to the first communication path if the first communication path is interrupted. This type of communication is particularly employed in automation networks where automation data which is of importance for a production process is used.

Such redundant communication can typically occur by a signal that is to be transmitted from a first network device of a first communication network to a second network device of a second communication network being transmitted by a node that connects the first communication network to the second communication network both to a network device of the first communication network and also to a further node in the second communication network. The signal is transmitted both in the first and also in the second communication network. Moreover, the signal transmitted by the first communication network is then transmitted to a further node of the second communication network. In this way, two different network paths are produced from the first network device of the first network to the second network device of the second communication network.

SUMMARY OF THE INVENTION

It is therefore an object of the invention to provide an improved method for redundant communication in a communication system. It is also an object of the invention to provide an improved node, an improved computer-readable storage medium for such a node and an improved communication system having such a node.

These and other objects and advantages are achieved in accordance with the invention by providing a method for redundant communication in a communication system. In accordance with the invention, the communication system includes a plurality of communication networks, where the communication networks are connected to each other by at least one node, and the communication networks include a plurality of network devices.

Within the communication system, data is transmitted from a first network device of the first communication network to a second network device of the second communication network through at least one node and/or from the first network device to a third network device of the first communication network. Transmission from the first to the second network device and/or transmission from the first to the third network device occurs over at least two redundant transmission paths. Here, two redundant transmission paths means that, within the communication network, two different paths are used from the first to the second and/or from the first to the third network device for the transmission of the data. Should one of the two transmission paths be faulty or interrupted, the transmitted data will nevertheless reach its destination by traversing another transmission path.

As a result of information that is redefined before the transmission, the transmission of data from the second communication network back to the first communication network is prevented for a transmission from the first to the second network device. The predefined information consists of a first part and a second part. The data comprises the first part of the predefined information and the node comprises the second part of the predefined information.

Such prevention of transmission of the data from the second communication network back to the first communication network is advantageous because this avoids the unnecessary transmission of data back to the first communication network. The destination of the data lies in the second communication network. As a result, it is advantageous to prevent the data being transmitted back into the first communication network. This avoids data circulating in the first network without this forming a redundant transmission path to the second network device. Prevention of transmission from the second communication network back to the first communication network is thus advantageous for preventing unnecessary data traffic in the first network.

By preventing reverse transmissions, the maximum possible delay difference between a frame of the data and its duplicate, which has been transmitted over the second redundant transmission path, is also reduced. Such duplicates that are registered twice at a node or at a network are filtered with a duplicate filter list. The reduction of the maximum possible delay difference enables duplicates to be reliably filtered with a smaller duplicate list, which is especially advantageous in automation systems including a number of automation networks.

An automation network may comprise, for example, an industrial automation network. Such industrial automation networks can typically be embodied, configured and/or provided for open-loop and or closed-loop control of industrial systems (e.g., production system or conveyor systems), machines and/or devices. In particular, automation networks or industrial automation networks can feature real-time communication protocols (e.g., Profinet, Profibus, Real-Time-Ethernet) for communication at least between the components involved in the open-loop and/or closed-loop tasks (e.g., between control units and systems and/or machines to be controlled). Secure transmission of data by storage media is also covered.

Moreover, in addition to a real-time communication protocol, at least one further communication protocol can be provided in the automation network or industrial automation network, e.g. for monitoring, configuring, reprogramming and/or changing the parameters for one or more control units in the automation network. It should be understood that the present invention is not limited to real-time capabilities, and other communication protocols may be used.

In some embodiments, the automation network includes wired communication components and/or wireless communication components. In other embodiments, the automation network includes at least one automation device.

In accordance with the disclosed embodiments, the automation device comprises a computer, PC and/or controller with control functions or control capabilities. In particular, an automation device can typically be an industrial automation device, which can for example be embodied, configured and/or provided specifically for open-loop and/or closed-loop control of industrial systems. In particular, such automation devices or industrial automation devices can have real-time capabilities, i.e., allow open-loop or closed-loop control in real-time. To this end, the automation device or the industrial automation device of the disclosed embodiments can include, for example, a real-time operating system and/or at least partly support a real-time communication protocol for communication, such as Profinet, Profibus or Real-Time Ethernet.

An automation network includes a number of sensors and actuators. The actuators and sensors are controlled by at least one control device. The actuators, the sensors and the at least one control device exchange data with one another. An automation protocol is used for the exchange of data. The at least one control device controls the actuators, the sensors and the exchange of data such that a mechanical production process runs in which a product is manufactured for example.

An industrial automation device can be a programmable logic control, for example, a module or part of a programmable logic control, a programmable logic control integrated into a computer or PC, as well as corresponding field devices, sensors, actuators, input and/or output devices for connection to a programmable logic control or can include such devices.

In accordance with the invention, an automation protocol comprises any type of protocol which is provided, suitable and/or configured for communication with automation devices in accordance with the disclosed embodiments. Such automation protocols can, for example, be the Profibus protocol (e.g. in accordance with International Electrotechnical Commission (IEC) protocol 61158/EN50170), a Profibus DP protocol, a Profibus PA protocol, a ProfiNet protocol, a ProfiNet I/O protocol, a protocol in accordance with the Actuator-Sensor (AS) Interface, a protocol in accordance with I/O Link, a KNX protocol, a protocol in accordance with a multipoint interface (MPI), a protocol for a point-to-point link (PtP), a protocol in accordance with the specifications of S7-communication (which is typically provided and configured for communication between programmable Logic controllers made by Siemens) or also an Industrial Ethernet protocol or Real-Time Ethernet protocol or further specific protocols for communication with automation devices. It should be readily understood that any given combination of the above-mentioned protocols can also be provided as an automation protocol within the scope and meaning of the disclosed embodiments of the present invention.

In accordance with the disclosed embodiments of the invention, the first part of the predefined information is read by the at least one node. The node thus then knows both parts of the predefined information. The first part has been read by the node from the data and the second part is located in the node, for example, on a digital storage medium, and can likewise be read out by the node.

The first part of the predefined information in accordance with the disclosed embodiments of the invention is a source address of the data. The source address of the data is the address of the network device which has sent out the data. This can typically be a Medium Access Control (MAC) address. The source address uniquely identifies the network device.

In this case, the second part of the predefined information is located in a database of the node. Each entry of the database comprises a network device address and at least one Forward Control (FWC) bit. With the at least one FWC bit, it is possible to specify that data may be sent, for example, only from the first to the second network, but not from the second to the first network. The at least one FWC bit is used to define the ports by which the node forwards the received data.

If data with a specific source address is received by the node, the node determines the second predefined information in the database by comparing the source address with the database entries. The second predefined information can, for example, be the at least one FWC bit that defines whether the received data will be forwarded to the first and/or to the second network.

In accordance with the disclosed embodiments of the invention the node comprises a number of ports. Data can be received and sent through each of the ports. The second part of the predefined information is located in a database that comprises a number of entries.

Initially, data is received at a first port. The first part of the predefined information is read out from the data that is received at the first port. The second part of the predefined information is determined by comparing the database entries with the first part of the predefined information. At least one second port for forwarding the data is determined from the second part of the predefined information if the second part of the predefined information includes at least a second port. The data is then forwarded through the at least one second port if the second part of the available information includes at least one second port. If the second part of the predefined information does not include a second port, forwarding of the data is prevented.

With the aid of the first part of the predefined information, the node determines the second part of the predefined information. The second part of the predefined information specifies whether, and if so, how many and which ports are to be used for forwarding the data. The forwarding direction of the data is thus able to be defined by the first and second part of the predefined information. For example, the first part or the second part of the predefined information could define that the data will only be forwarded through the port that is connected to the first network. In this way, transmission of the data into the second network is prevented. The same method can also be employed to prevent transmission of the data from the second to the first communication network.

In accordance with the disclosed embodiments of the invention, the node comprises a number of ports. Data can be received and sent through each of the ports. The second part of the predefined information consists of a database that includes a number of entries, whereby each entry comprises no send port or at least one associated send port for each of the ports.

The first part of the predefined information comprises a data destination. Typically, the data destination can be a multicast or unicast address of the data. The first part of the predefined information thus defines the network device to which the data is to be transferred.

At the node, the data is initially received at a first port. The node then reads the data destination and registers the first port as the receive port. A search is then made in the database for the database entry which matches the data destination and the first port. Each database entry also comprises no send port or at least one send port. The respective send port is thus defined by the first port and by the data destination. It is also possible for no send port to be defined for a first port and a specific data destination. In this case, the data is not forwarded.

The at least one send port belonging to the first port is read out from the database if the database entry includes at least one send port. The data is forwarded by the at least one read-out send port if the database entry includes at least one send port. If the database entry does not include a send port, forwarding of the data is prevented. In other words, the node determines from the data destination and the received port whether and through which port or ports the data is to be forwarded.

In accordance with the disclosed embodiments of the invention, each database entry and the data destination is characterized by a multicast address or a unicast address.

In accordance with the disclosed embodiments, the communication system is an automation system. The data in this case is automation data. Such an automation system is especially advantageous because unnecessary data transmissions are prevented in the first network. Accordingly, possible delays on transmission of other data in the first communication network are prevented. As a result, a smooth production processes aided by the automation system is guaranteed.

It is also an object of the invention to provide a node having a plurality of ports configured for connecting at least one communication network of a communication system to a second communication network of the communication system. Here, each port is connected to a communication network. For example, two ports of the node can be connected to a first communication network and two ports of the node can be connected to the second communication network. The node can thus forward data within the first communication network or within the second communication network. Data can also be forwarded from the first communication network to the second communication network and from the second communication network to the first communication network.

Data can be received from the first and the second communication network through the ports and sent out to the first and the second communication network. The node includes a device for reading out a first part of predefined information from the data. The node further comprises a storage device and a read-out device for storing and reading out a second part of the predefined information. Preferably, the second part of the predefined information is stored on a digital storage medium in the node.

In addition, the node includes a prevention device. The prevention device is configured, depending on the predefined information, to prevent transmission of received data that originates from the first communication network and has been received at the node from the second communication network from being transmitted back into the first communication network.

Another object of the invention is to provide a computer-readable storage medium with instructions, which when executed in a node in accordance with the disclosed embodiments of the invention in a communication system, cause the node to perform the method of the invention. For example, data is initially data received through a first port. The first port is registered as the receive port. A first part of predefined information is read out from the received data. A second part of the predefined information is read out from the storage device of the node. Transmission of the received data, which originates from the first communication network and has been received at the node from the second communication network back into the first communication network, is prevented because of the predefined information.

It is also a further object of the invention to provide a communication system with at least one node in accordance with the disclosed embodiments of the invention. Here, the communication system comprises at least one first and one second communication network. The at least one node comprises a plurality of ports, whereby the node connects at least the first communication network to the second communication network of the communication system through the plurality ports.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the invention are explained in greater detail below with reference to the drawings, in which.

DETAILED DESCRIPTION OF THE PRESENTLY PREFERRED EMBODIMENTS

Figure 1:
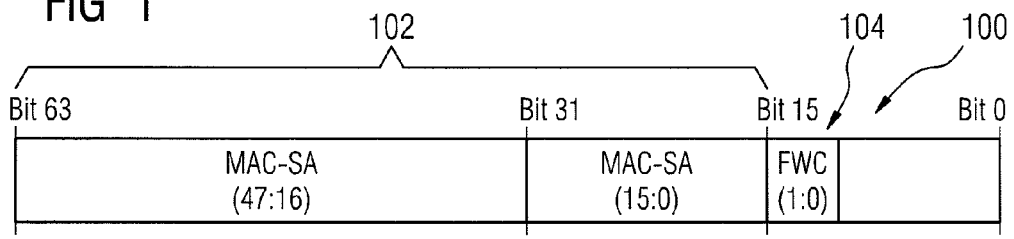
FIG. 1 shows a schematic block diagram of an entry in a database of the node with Forward Controlling Bits (FWC) bits.

Elements of the subsequent figures which correspond to one another are identified by the same reference characters.

FIG. 1 is a schematic diagram of an entry 100 in a database of a node. The node connects two communication networks (not shown here). Each database entry of this database is compared with a first part of predefined information of data to be transmitted. The first part of the predefined information, in accordance with the disclosed embodiments of the invention, is the source address of the data. The source address of the data is the address of the network device that has sent out the data. Typically, the source address of the data can be a Media Access Control (MAC) source address. The MAC source address can also comprise the MAC Source Address (MAC-SA). The database entry 100 comprises 64 bits, with the numbering extending from 0 to 63. A MAC-SA 102 is stored in bits 16-63 of the database entry 100. The database entry 100 also includes two Forward Control (FWC) bits 104. The FWC bits are bits 14 and 15 of the database entry 100. More FWC bits or just one FWC bit can also be used. The FWC bits form a second part of the predefined information.

If data is now received at the node, the node reads the first predefined information from the data. The first predefined information is the MAC-SA of the data. The node then compares this MAC-SA of the data with the entries in the database. If the MAC-SA of the data matches the MAC-SA 102 of an entry in the database, the node reads out the FWC bits 104 of the database entry and forwards the data aided by the FWC bits.

Figure 2:
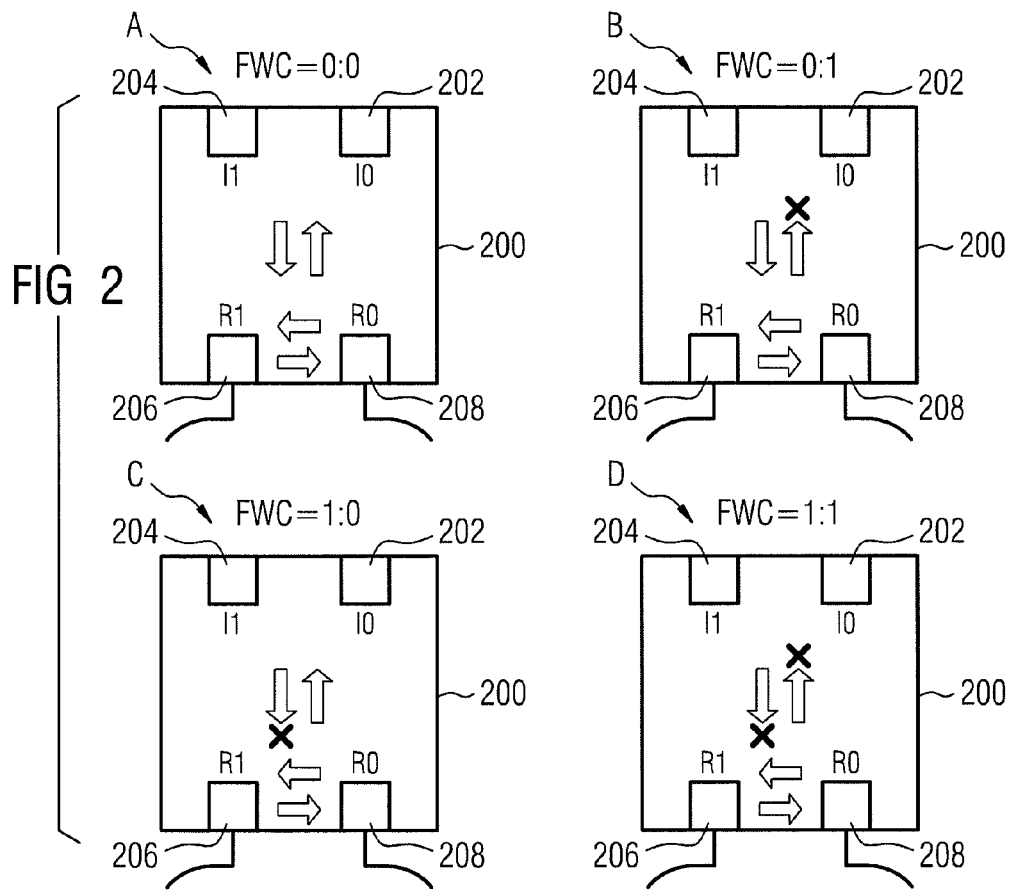
FIG. 2 shows a schematic block diagram of a node with four ports, through which data can be received and sent, whereby forwarding of data to specific ports is prevented by specific FWC Bits.

FIG. 2 is a schematic block diagram showing four nodes 200, and illustrates the forwarding of data. If the second predefined information has been read out, depending on the second predefined information read out, the FWC bits, the data is forwarded differently. The node 200 includes four ports 202, 204, 206, 208.

In part A of FIG. 2, the node 200 has read out the FWC bits 0:0. Here, the node 200 forwards the data to each of its four ports 202, 204, 206, 208. In this case, the data will be output again through each port.

The node 200 can be located, for example, in a first communication network. Data can be received from a second automation network at port 204. Data can be output to the second communication network through port 202. Ports 206 and 208 respectively are used for receiving and for transmitting data from the first and to the first communication network.

Part B of FIG. 2 is a schematic view of a node 200 as depicted in part A. This part differs from part A in that the FWC bits 0:1 have been read out from the database. The FWC bits 0:1 cause the node 200 not to send any data out from port 202. A transmission of data to the second communication network is thus prevented.

Part C is a schematic view of a node 200 as depicted in parts A and B, where here the node 200 has now read out the FWC bits 1:0. These FWC bits cause the node 200 not to output data to the first network that has been received via port 204 from the second network. This can for example be the case for data that is not to be transmitted to the first communication network.

Part D is a schematic diagram of a node 200 as depicted in parts A-C, with the difference here being that the node 200 has read out the FWC bits 1:1. In such a case, data is both prevented from being transmitted from the first into the second network and also from the second into the first network. Only transmission from port 206 to port 208 or only transmission from port 208 to port 206 is possible. Thus, both the transmission of data from the first into the second network and also in the other direction is prevented.

This presently disclosed method comprises a source address-dependent forwarding of the data.

Figure 3:
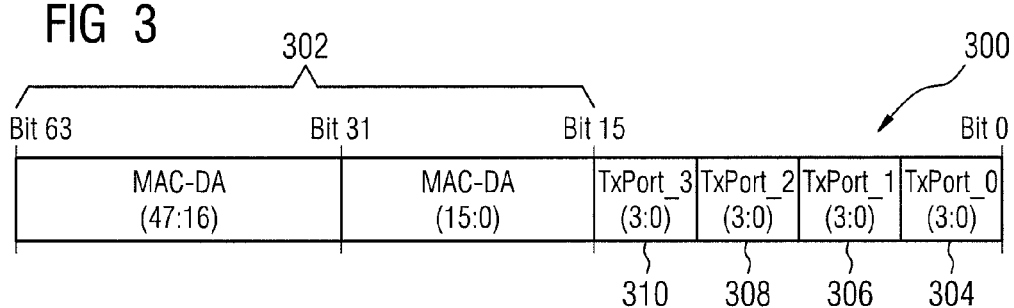
FIG. 3 shows a schematic block diagram of an entry in a database in the node, in which a first port is assigned a received port belonging to the first port.

FIG. 3 is a schematic block diagram of the database entry 300 in a node 200 in a communication system (not shown). Here, the database entry 300, unlike the database entry of FIG. 1 comprises a destination address (MAC-DA) 302. The MAC-DA 300 has the same format as the MAC-SA from FIG. 1. The destination address 302 designates a data destination. The MAC-DA 302 corresponds to the MAC address of a network device. The database entry 300 also includes in bits 0 to 15 four entries 304, 306, 308, 310, in which for the destination address 302 a send port is defined for each potential receive port of the node. Entries 304-310 can thus also be referred to as definition bits.

The database entry 300 thus defines, for data with the destination address 302, the port through which the data is to be sent out if it is received at a specific port. Definition bits 304 are typically defined for each receipt of the data at a first port the associated send port, while definition bits 306 define the send port for the receipt of the data at a second receive port. The same applies for the definition bits 308 and 310 for a third and a fourth receive port. Thus, one or more send ports are defined for each potential receive port. The definition bits 304-310 can likewise define for a receive port that the data is not to be transmitted any further. In this case, the database entry 300 for the data destination 302 with the corresponding receive port does not include any associated send port.

The presently described embodiment comprises a destination address-dependent forwarding of the data.

Figure 4:
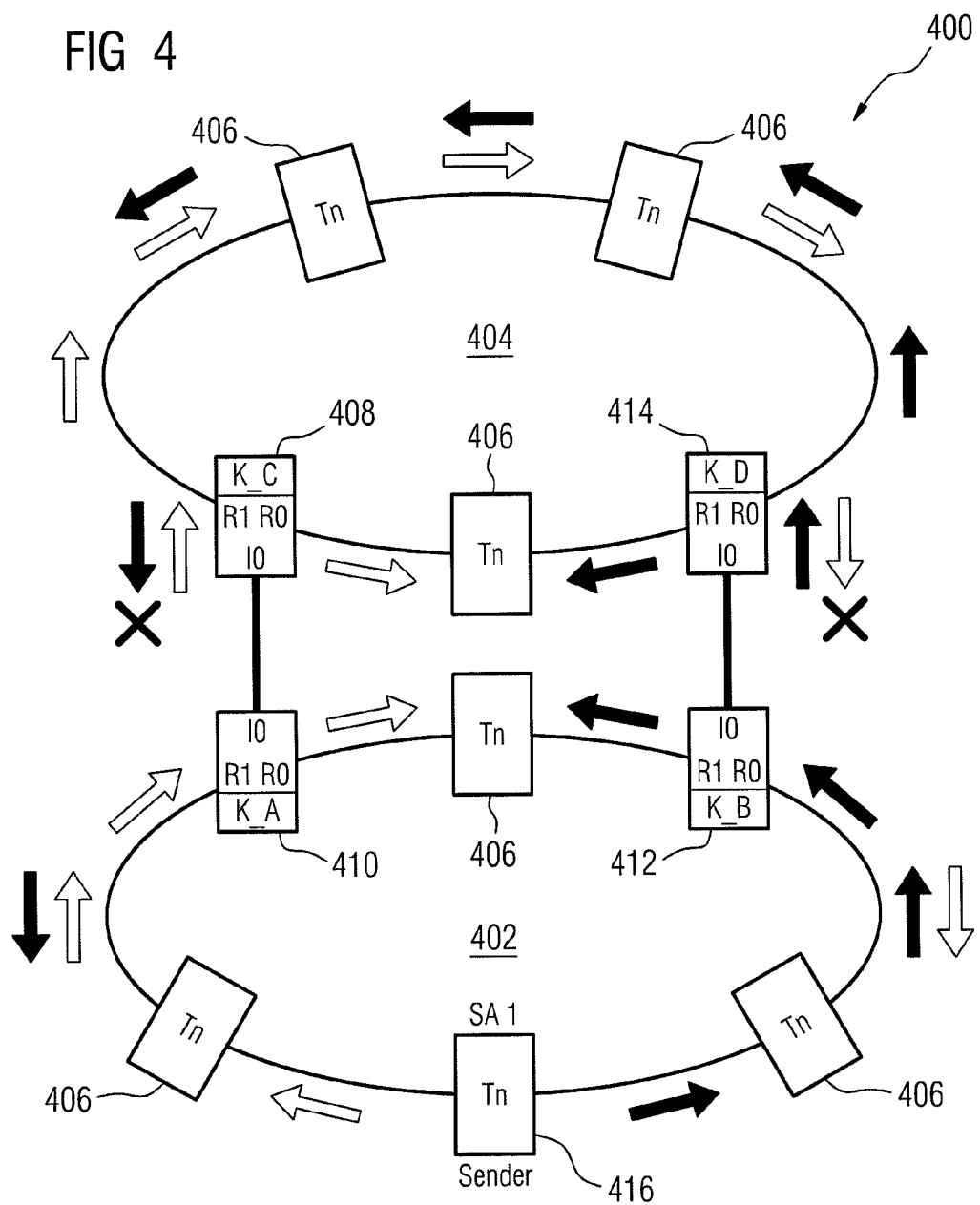
FIG. 4 shows a schematic block diagram of a communication system with two communication networks which are connected to one another by nodes, whereby data transmission from the second to the first network is prevented.

FIG. 4 is a schematic block diagram of a communication system 400 with a first communication network 402 and a second communication network 404. The first communication network 402 is connected to the second communication network 404 by four nodes 408, 410, 412, 414. Nodes 408 and 410 form a connection between the first communication network 402 and the second communication network 404 at a first point, and nodes 412 and 414 form a connection between the first communication network 402 and the second communication network 404 at a second point. The first and second communication network 402 and 404 each comprise a plurality of network devices 406.

The data is sent out by a sender 416 in the first communication network 402. The communication network 402 is shown in this figure as a ring network. It should be noted, however, that other network geometry is also possible, and that it is not the intention to be limited merely to embodiments in which a ring network is implemented. In the ring structure of the first communication network 402, the sender 416 transmits the data to both its right-hand and left-hand neighbors in the ring structure.

Sending of the data in two different directions is designed to ensure the provision of two redundant transmission paths for the destination of the data. The data reaches both node 410 and also node 412. Because of the source address of the sender, of the data is forwarded from the nodes 410 and 412 to the second communication network 404. As an alternative, such forwarding can occur based on the destination address of the data. The decision as to whether data is to be forwarded to the second communication network 404 is made based on the predefined information, where the predefined information consists of a first and a second part. The first part is the source address of the data or the destination address of the data. The second part of the information is located in the node. The second part of the information is read out from a database.

After the data has been transmitted from node 412 to node 414 and from node 410 to node 408, the data continues to be transmitted over two redundant transmission paths through the second communication network 404. No data is transmitted back from nodes 408 and 414 to nodes 410 and 412 because of the predefined information.

Preventing data from being transmitted back to nodes 410 and 412 can be defined either by the destination address or by the source address of the data. For example, a transmission from the second network 404 to the first network 402 is prevented if the source address in the databases of the nodes 408 and 414 is linked to at least one FWC bit that prevents transmissions to the first communication network 402. Alternatively, transmission can be prevented by definition bits, as described with respect to FIG. 3.

The FWC bits 00 would typically be stored for the source address of the data in node 410 to prevent transmission by the FWC bits, which allows transmission into the second communication network 404. The FWC bits 00 are likewise stored in the database of node 412. In nodes 408 and 414 of the second communication network 404, the FWC bits 01 are linked to the source address of the data in the database, which prevents a transmission into the first communication network 402.

In preventing data transmission by the destination address, as described in FIG. 3, transmission of the data to the second communication network 404 is allowed in node 410 and in node 412. In node 408 and 414, transmission of the data into the first communication network 402 is prevented.

Such a configuration of the nodes is advantageous to prevent data from being transmitted back into the first communication network.

Figure 5:
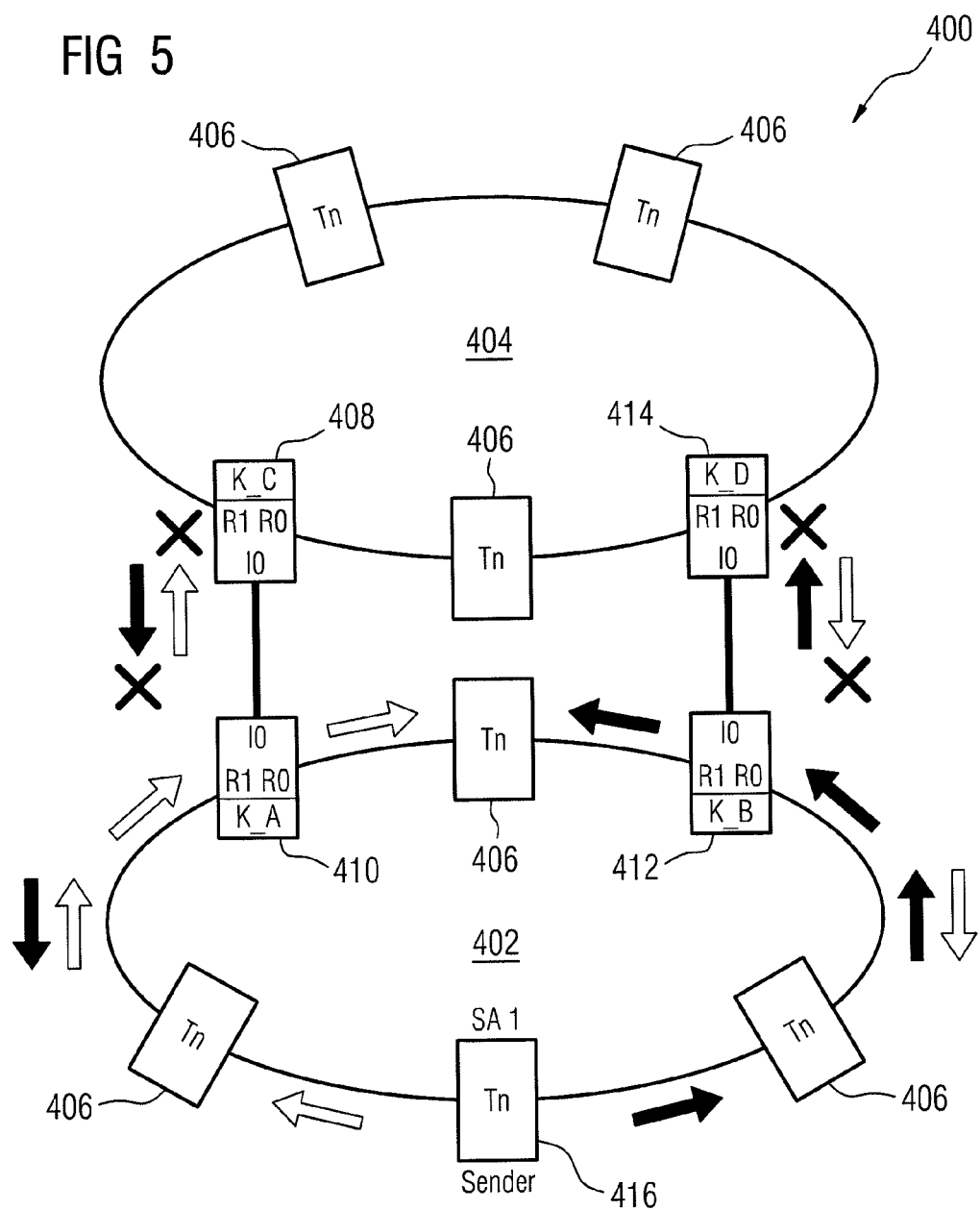
FIG. 5 shows a schematic block diagram of a communication system with two communication networks that are connected to one another by nodes, whereby data transfer from the first to the second network is prevented.

FIG. 5 is a schematic block diagram of a communication system 400 with the first communication network 402 and a second communication network 404.

Communication networks 402 and 404 are structured in a similar way to the communication networks depicted in FIG. 4. In FIG. 5, however, the sender 416 again transfers data to two network devices 406 of the first communication network 402. In nodes 410 and 412 data transmission into the second communication network 404 is prevented. The transmission can typically be prevented by FWC bits. FWC bits are stored for this purpose for the source address of the sender 416 in the databases of nodes 410 and 412, which allow transmission of the data into the second communication network 404. However, FWC bits 11 are stored for the source address of the sender 416 in nodes 408 and 414, which do not allow forwarding of the data within the second communication network 404. The data from sender 416 is thus transmitted from node 410 to node 408 and from node 412 to node 414. Nodes 408 and 414 do not forward the data, however, so that unnecessary data traffic in the second communication network 404 is avoided.

Alternatively, the data transmission can be prevented by comparing the destination address of the data with the database in nodes 408-414. To suppress data transmission from the first communication network 402 to the second communication network 404, in nodes 408 and 414 for received data with this destination address it is defined in the database that such data is not to be forwarded via ports connected to the second communication network 404. Thus, unnecessary data transmissions in the second communication network 404 are prevented.

Figure 6:
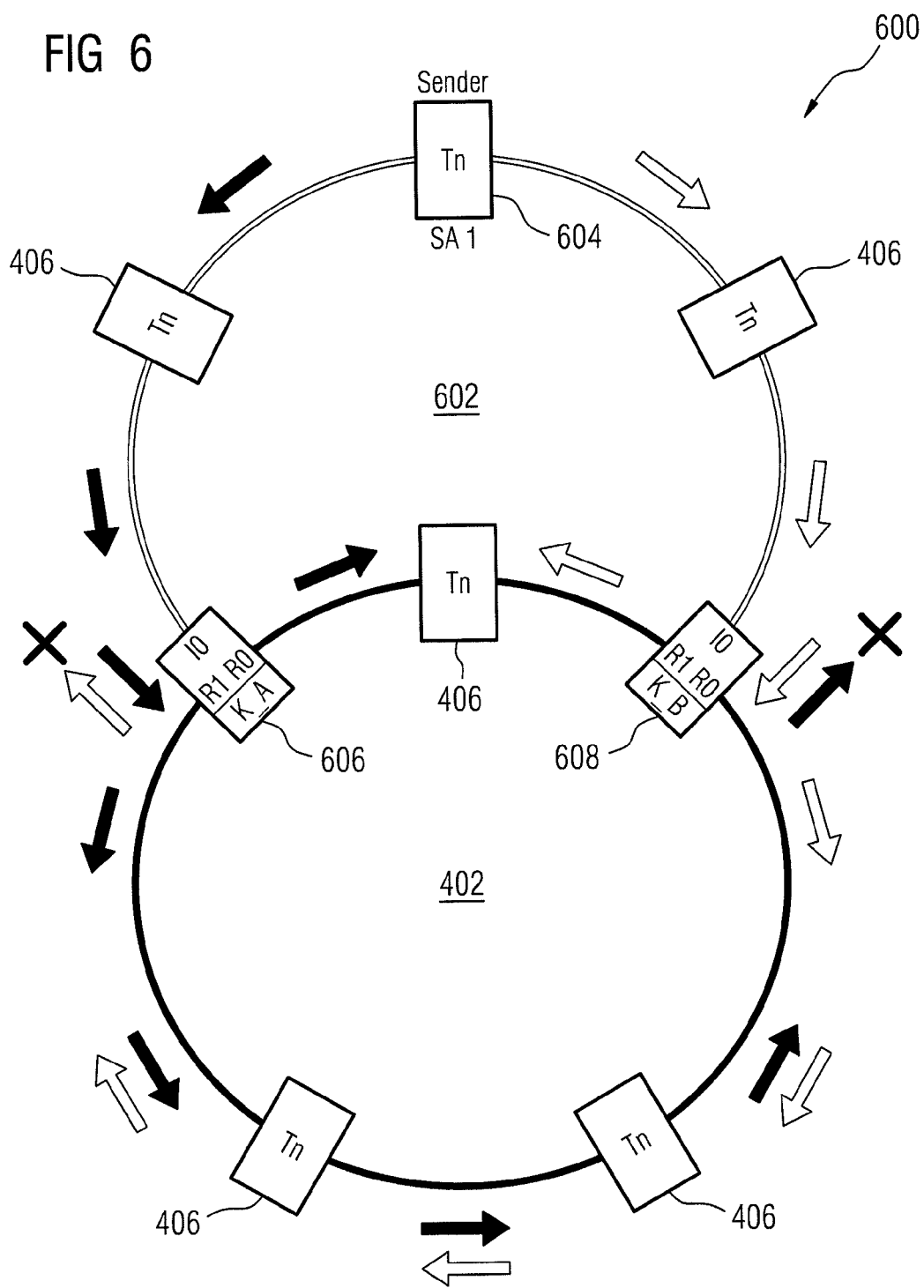
FIG. 6 shows a schematic block diagram of a communication system with two communication networks which are connected to one another by nodes, whereby one communication is comprises a garland and one communication comprises a ring.

FIG. 6 is a schematic block diagram of a communication system 600 with a first communication network 402 and a second communication network 602. Communication network 602 comprises a garland, i.e., communication network 602 does not form a self-contained ring. Here too it should once again be stressed that other network geometries are able to be employed for the first and the second communication network 402 and 602. To simplify the diagram, a ring-shaped first communication network 402 and a garland-shaped second communication network 602 are shown.

A data sender 604 is located in the second communication network 602 that sends out data to its two neighboring network devices 406. The data is forwarded through nodes 606 and 608 to the first communication network. Transmission of the data back into the second communication network 602 is prevented by nodes 606 and 608. The transmission can, for example, be prevented by FWC bits 0:1 being stored for the destination address of the data in the database of nodes 606 and 608, which would make it possible to transmit data from the second communication network 602 into the first communication network 402. Transmission of the data back from the first communication network 402 into the second communication network 602, on the other hand, is prevented by the FWC bits 0:1.

Alternatively, it can be defined with the definition bits in the databases of nodes 606 and 608 for the destination address of the data that this data may not be output through the port that is connected to the second communication network 602. This prevents the data being transmitted back from the first communication network 402 to the second communication network 602.

Figure 7:
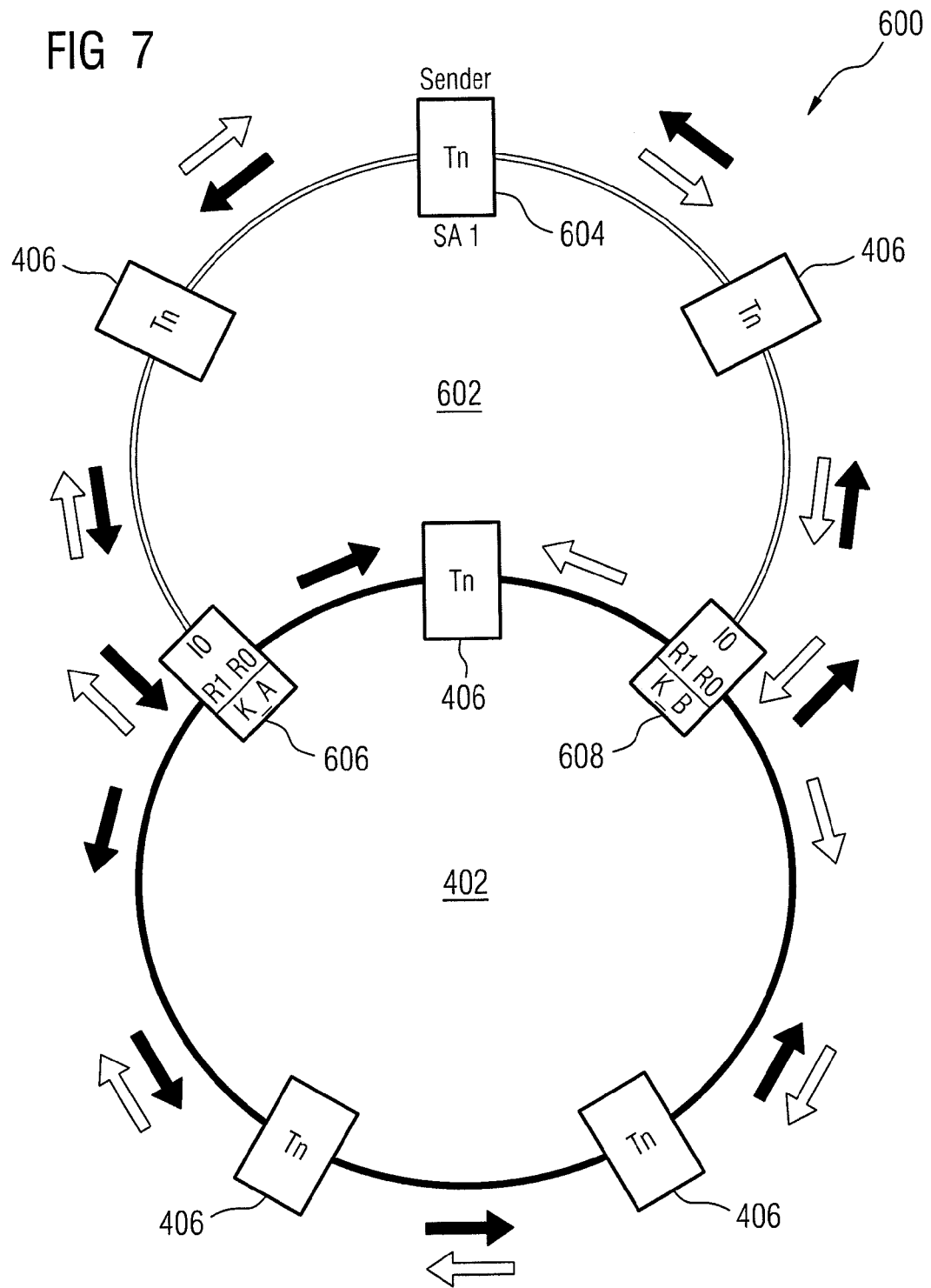
FIG. 7 shows a schematic block diagram of a communication system with two communication networks with redundant communication of a sender in the garland network.

FIG. 7 is a schematic block diagram of a communication system with a first communication network 402 and a second communication network 602. The two communication networks 402 and 602 are connected by the nodes 606 and 608. Unlike in FIG. 6, a transmission of the data that was sent out by sender 604, from the first communication network 402 to the second communication network 602, is now made possible. This is achievable, for example by the FWC Bits 0:0 being stored for the source address of the sender 604 in nodes 606 and 608 in the database, which allows the data to be transmitted back into the second communication network 602. Alternatively, it can be defined by the definition bits in the database for the destination address of the data that transmission of the data back into the second communication network 602 is possible. Thus, two redundant transmission paths will be created even for a garland-shaped communication network like the second communication network 602.

Figure 8:
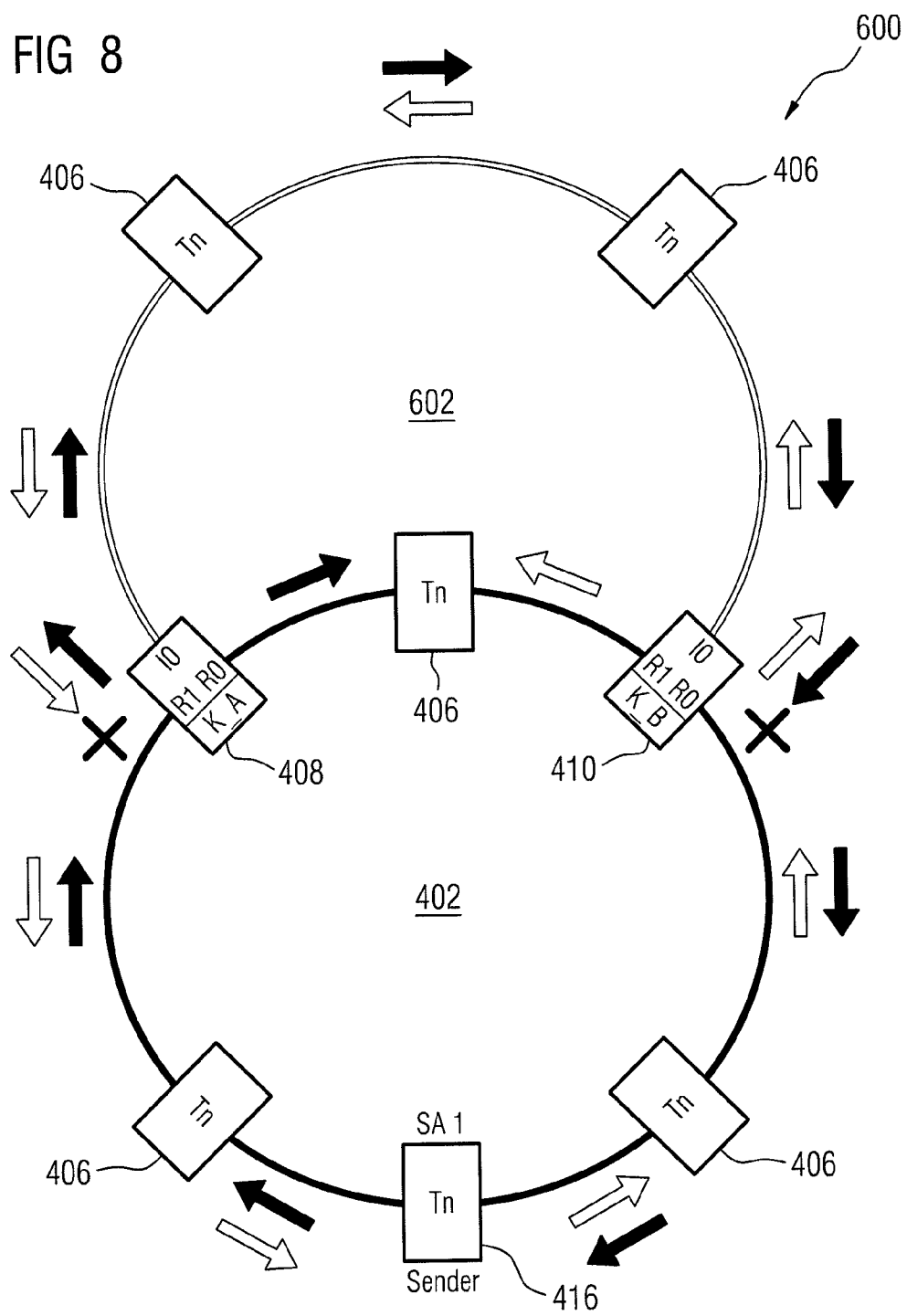
FIG. 8 shows a schematic diagram of a communication system with two communication networks with a data sender in the ring network and redundant communication.

FIG. 8 is a schematic block diagram of a communication system 600 with the first communication network 402 and a second communication network 602. The data is sent out by a sender 416 in the first communication network 402 in two directions. Nodes 408 and 410 connect the first communication network 402 to the second communication network 602. If the data sent out by the sender 416 reaches nodes 408 and 410, then the data is forwarded to network devices 406 of the second communication network 602. Transmission of the data back from the second communication network 602 to the first communication network 402 is prevented.

The transmission can be prevented, for example, by FWC bits 10. For this purpose, the FWC bits 10 are stored in the databases of nodes 408 and 410 for the source address of the sender 416. These FWB bits 10 prevent data from being transmitted back from the second communication network 602 into the first communication network 402.

Alternatively, the prevention of transmission of data back from the second communication network 602 to the first communication network 402 can be undertaken by the definition bits. For this purpose, no send ports are assigned in the databases of nodes 408 and 410 for the destination address of the data 416 on receipt through the ports that are connected to the second communication network 602. Thus, transmission of the data from the second communication network 602 to the first communication network 402 is prevented.

Figure 9:
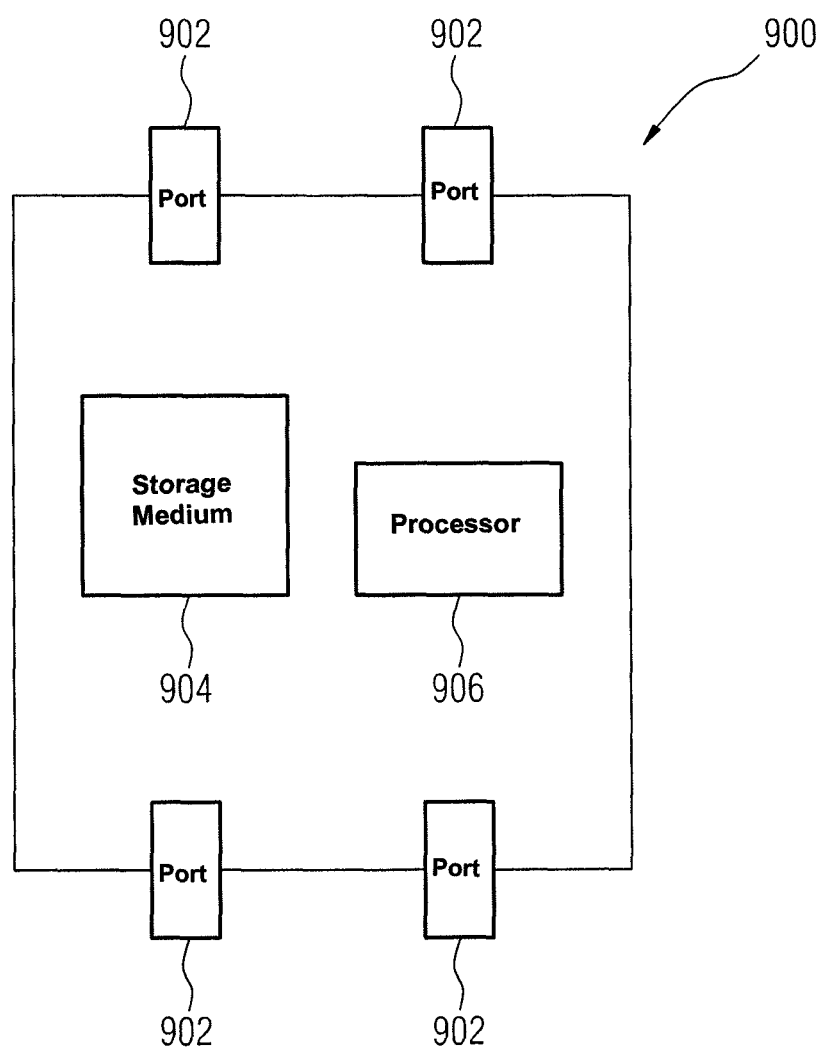
FIG. 9 shows a block diagram of a node in accordance the invention.

FIG. 9 is a schematic block diagram of a node 900. The node 900 comprises a plurality of ports 902, where port 902 is configured for receiving and sending out data. In addition, the node 900 includes a digital storage medium 904. The database with the second part of the predefined information is stored on the digital storage medium 904. In addition, a computer program with instructions is stored on the digital storage medium 904. The computer program can be executed by the processor 906 of the node 900. Upon execution of the computer program, the received port is registered on receipt of data and the first part of the predefined information is read out from the data. The first part of the predefined information is compared with the database of the node 900 and the second part of the predefined information is read out. The processor 906 is embodied, on execution of the program, to prevent data, which originates from the first communication network and has been received from the second communication network, from being transmitted back into the first communication network.

Figure 10:
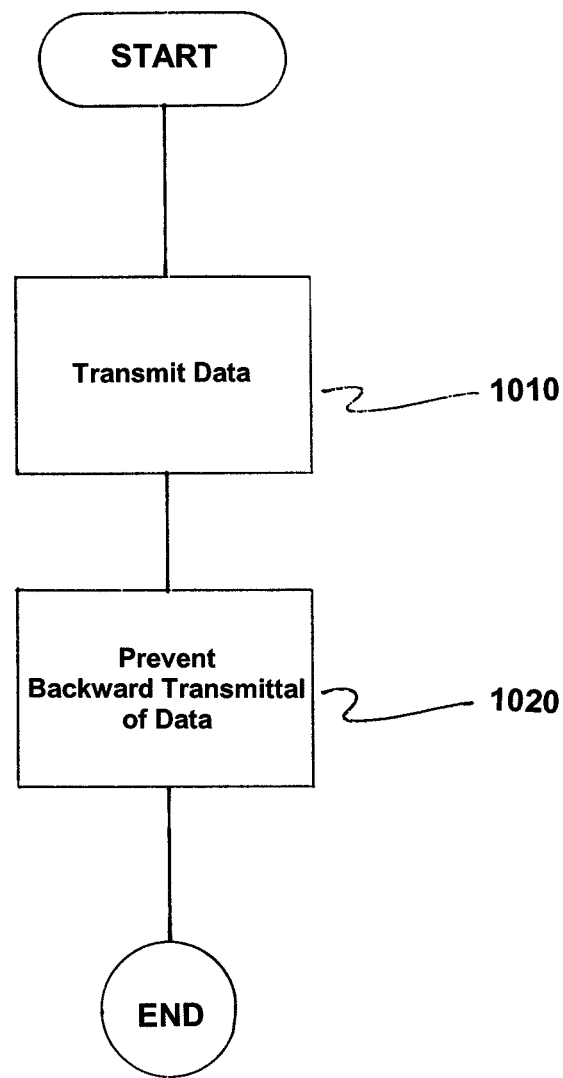
FIG. 10 is a flow chart illustrating a method in accordance with an embodiment of the invention.

FIG. 10 is a flow chart illustrating a method for redundant communication in a communication system having a plurality of communication networks connected to each other by at least one node, where the communication networks comprises a plurality of network devices. The method comprises transmitting data from a first network device of a first communication network of the plurality of networks to a second network device of a second communication network of the plurality of communication networks through at least one of an at least one node of the plurality of nodes and from the first network device to a third network device of the first communication network of the plurality of networks, such that transmission from at least one of the first network device to the second network device and transmission from the first to the third network device is undertaken over at least two redundant transmission paths, as indicated in step 1010. Data is prevented from being transmitted back from the second communication network to the first communication network during a transmission from the first network device to the second network device based on information predefined before the transmission, as indicated in step 1020. In accordance with the invention, the predefined information comprises a first part and a second part, the data comprising the first part of the predefined information, and the at least one node comprises the second part of the predefined information.

Thus, while there are shown, described and pointed out fundamental novel features of the invention as applied to preferred embodiments thereof, it will be understood that various omissions and substitutions and changes in the form and details of the illustrated method and apparatus, and in their operation, may be made by those skilled in the art without departing from the spirit of the invention. Moreover, it should be recognized that methods and structures shown and/or described in connection with any disclosed form or embodiment of the invention may be incorporated in any other disclosed or described or suggested form or embodiment as a general matter of design choice.

What is claimed is:

1. A method for redundant communication in a communication system having a plurality of automation networks connected to each other by at least one node, the automation networks comprising a plurality of network devices, the method comprising:
    transmitting data by a transmission at least one of from a first network device of a first automation network of the plurality of networks to a second network device of a second automation network of the plurality of automation networks through the at least one node and from the first network device to a third network device of the first automation network of the plurality of automation networks, such that the transmission at least one of from the first network device to the second network device and from the first to the third network device is undertaken over at least two redundant transmission paths based on (i) a real-time communication protocol and (ii) at least one further communication protocol for at least one of configuring, reprogramming and changing parameters for at least one control unit in the plurality of automation networks; and
    preventing the data from being transmitted back from the second automation network to the first automation network during a transmission from the first network device to the second network device based on predefined information that is predefined before the transmission;
    wherein the predefined information comprises a first part and a second part and is read from the at least one node, the data comprising the first part of the predefined information, and the at least one node comprises the second part of the predefined information, the prevention of data from being transmitted from the second automation network back to the first automation network being based on whether the data comprising the first part of the predefined information matches data in an entry of a database of the at least one node; and
    wherein the at least one node includes a plurality of ports, the data is receivable and sendable by each of the plurality of ports, the second part of the predefined information is located in the database including a plurality of entries, each entry includes for each of the plurality of ports one of an unassociated send port and at least one associated send port, and the first part of the predefined information includes a data destination, the method further comprising:
        receiving the data at a first port of the at least one node;
        reading out the data destination and registration of the first port;
        searching in the database for a database entry matching the data destination and the first port;
        reading out from the database at least one send port belonging to the first port if the database entry includes the at least one send port;
        forwarding the data about at least one read-out send port if the database entry includes the at least one send port; and
        preventing forwarding of the data if the database entry does not include a send port.

2. The method as claimed in claim 1, wherein the method further comprises:
    reading out the first part of the predefined information;
    determining the second part of the predefined information by comparing database entries in the database with the first part of the predefined information;
    reading out at least one second port for forwarding the data from the second part of the predefined information if the second part of the predefined information comprises at least one second port;
    forwarding the data through at least one second port if the second part of the predefined information includes the at least one second port; and
    preventing forwarding of the data through the at least one second port if the second part of the predefined information does not include the at least one second port.

3. The method as claimed in claim 1, whereby each database entry and the data destination are characterized by a multicast address or a unicast address.

4. The method as claimed in claim 1, wherein the communication system comprises an automation system and the data comprise automation data.

5. A node having a plurality of ports configured to connect a first automation network of a communication system to a second automation network of the communication system, data being receivable through a port of the plurality of ports from the first and second automation networks and being sendable to the first and second automation networks, the node comprising:
- a storage device;
- a database; and
- a processor configured to read out a first part of predefined information from the data, configured to read out a second part of the predefined information from the storage device, and configured to, depending on the predefined information, prevent a transmission of received data that originates from the first automation network and is received at the node from the second automation network based on (i) a real-time communication protocol and (ii) at least one further communication protocol for at least one of configuring, reprogramming and changing parameters for at least one control unit in a plurality of automation networks, back into the at least one first automation network, the prevention of data from being transmitted from the second communication network back to the first automation network being based on whether the data comprising the first part of the predefined information matches data in an entry of the database;

wherein the data is receivable and sendable by each of the plurality of ports, the second part of the predefined information is located in the database including a plurality of entries, each entry includes for each of the plurality of ports one of an unassociated send port and at least one associated send port, and the first part of the predefined information includes a data destination, the node being configured to:
- receive the data at a first port;
- read out the data destination and registration of the first port;
- search in the database for a database entry matching the data destination and the first port;
- read out from the database at least one send port belonging to the first port if the database entry includes the at least one send port;
- forward the data about at least one read-out send port if the database entry includes the at least one send port; and
- prevent forwarding of the data if the database entry does not include a send port.

6. A non-transitory computer-readable storage medium encoded with computer instructions which, when executed on a node in a communication system, causes the node to perform the instructions comprising:
- program code for receiving data through a first port of the node;
- program code for registering the first port;
- program code for reading out a first part of predefined information from the received data;
- program code for reading out a second part of the predefined information from storage device of the node; and
- program code for preventing the received data, which originates from a first automation network and has been received at the node from a second automation network, from being transmitted back into the first automation network based on the predefined information and based on (i) a real-time communication protocol and (ii) at least one further communication protocol for at least one of configuring, reprogramming and changing parameters for at least one control unit in a plurality of automation networks, the prevention of data from being transmitted from the second automation network back to the first automation network being based on whether the data comprising the first part of the predefined information matches data in an entry of a database of the node;

wherein the first part of the predefined information is read from the node;

wherein the node includes a plurality of ports, the data is receivable and sendable by each of the plurality of ports, the second part of the predefined information is located in the database including a plurality of entries, each entry includes for each of the plurality of ports one of an unassociated send port and at least one associated send port, and the first part of the predefined information includes a data destination, the instructions further comprising:
- program code for reading out the data destination and registration of the first port;
- program code for searching in the database for a database entry matching the data destination and the first port;
- program code for reading out from the database at least one send port belonging to the first port if the database entry includes the at least one send port;
- program code for forwarding the data about at least one read-out send port if the database entry includes the at least one send port; and
- program code for preventing forwarding of the data if the database entry does not include a send port.

7. A communication system comprising:
- a node; and
- at least a first and a second automation network;

wherein the node includes a plurality of ports, and the node connects at least the first automation network to the second automation network of the communication system through the plurality of ports, a storage device, and a processor configured to read out a first part of predefined information from data received through one of the ports, configured to read out a second part of the predefined information from the storage device, and configured to, depending on the predefined information, prevent a transmission of received data that originates from the first automation network and is received at the node from the second automation network based on (i) a real-time communication protocol and (ii) at least one further communication protocol for at least one of configuring, reprogramming and changing parameters for at least one control unit in a plurality of automation networks, back into the at least one first automation network, the prevention of received data from being transmitted from the second automation network back to first automation network being based on whether the data comprising the first part of the predefined information matches data in an entry of a database of the node;

wherein the first part of the predefined information is read from the node;

wherein the data is receivable and sendable by each of the plurality of ports, the second part of the predefined information is located in the database including a plurality of entries, each entry includes for each of the plurality of ports one of an unassociated send port and at least one associated send port, and the first part of the predefined information includes a data destination, the node being configured to:
- receive the data at a first port;
- read out the data destination and registration of the first port;
- search in the database for a database entry matching the data destination and the first port;

read out from the database at least one send port belonging to the first port if the database entry includes the at least one send port;

forward the data about at least one read-out send port if the database entry includes the at least one send port; and prevent forwarding of the data if the database entry does not include a send port.

8. The communication system as claimed in claim 7, wherein the communication system is configured to:

transmit data by a transmission at least one of from a first network device of the first automation network to a second network device of the second automation network through the node and from the first network device to a third network device of the first automation network, such that the transmission at least one of from the first network device to the second network device and from the first to the third network device is undertaken over at least two redundant transmission paths based on (i) the real-time communication protocol and (ii) at least one further communication protocol for at least one of configuring, reprogramming and changing parameters for at least one control unit in the plurality of automation networks; and prevent the data from being transmitted back from the second automation network to the first automation network during a transmission from a first network device to a second network device based on information predefined before the transmission;

wherein the predefined information comprises a first part and a second part, the data comprising the first part of the predefined information, and the node comprises the second part of the predefined information.

9. The communication system as claimed in claim 7, wherein the communication system is part of an automation system and the data comprise automation data.

* * * * *